United States Patent [19]
Dixon et al.

[11] Patent Number: 4,801,107
[45] Date of Patent: Jan. 31, 1989

[54] CASSETTE LOCKING SYSTEM

[75] Inventors: Dale A. Dixon, Torrance; Forrest Hannan, Azusa, both of Calif.

[73] Assignee: Sotar, Inc., Torrance, Calif.

[21] Appl. No.: 922,027

[22] Filed: Oct. 22, 1986

[51] Int. Cl.$^4$ .................. G11B 15/32; G11B 23/04
[52] U.S. Cl. ..................................... 242/198; 242/199
[58] Field of Search ............... 242/198, 199, 197, 200

[56] References Cited

U.S. PATENT DOCUMENTS

| | | | |
|---|---|---|---|
| 4,106,724 | 8/1978 | Higashida | 242/198 |
| 4,232,840 | 11/1980 | Sugawara | 242/198 |
| 4,482,104 | 11/1984 | Saito | 242/198 |
| 4,579,295 | 4/1986 | Marada | 242/198 |
| 4,623,105 | 11/1986 | Pertzsch | 242/198 |
| 4,702,434 | 10/1987 | Brauer | 242/198 |

Primary Examiner—Stanley N. Gilreath
Assistant Examiner—Katherine Hatecki
Attorney, Agent, or Firm—Knobbe, Martens, Olson & Bear

[57] ABSTRACT

A conventional reel brake in a video cassette is modified so that it will not function to release the brake when the cassette is placed in a cassette player unless a disabling device in the cassette is first unlocked or reset by external means. Further, when the cassette is unlocked and allowed to be played, it is once more disabled when the cassette is removed from the player. Thus, the cassette must be once more reset or unlocked before it can be played again.

16 Claims, 4 Drawing Sheets

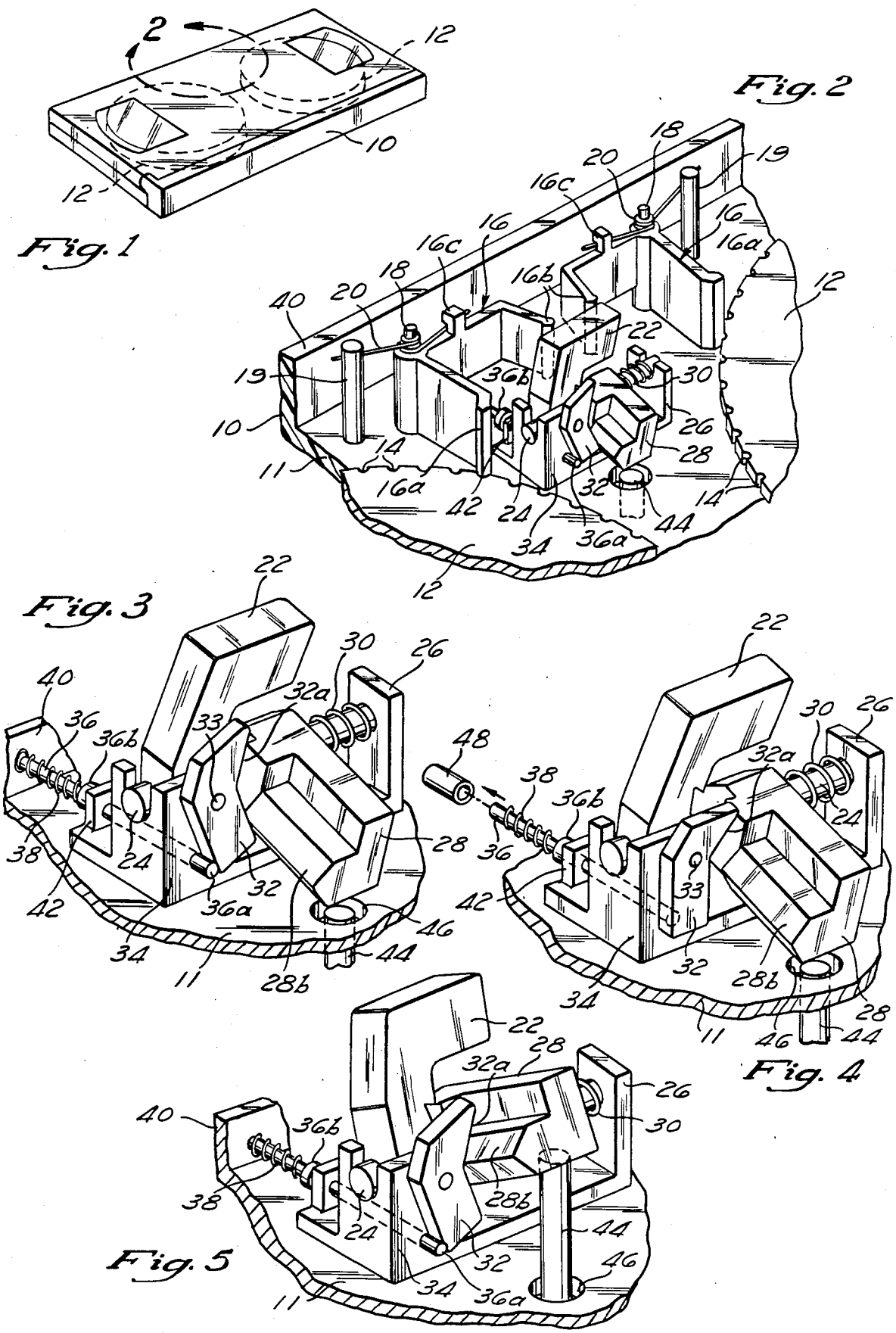

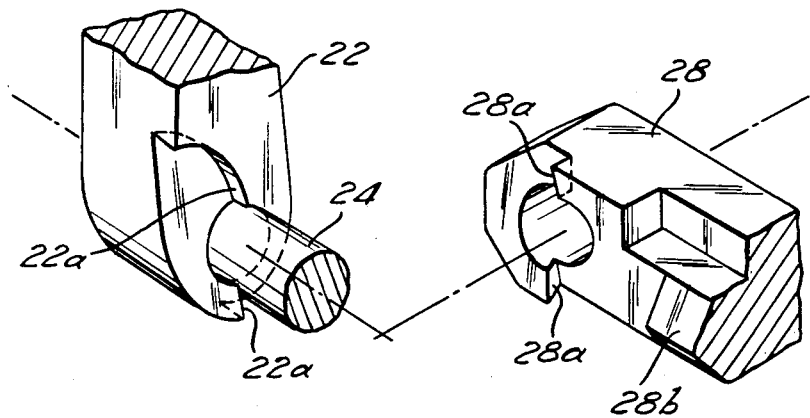
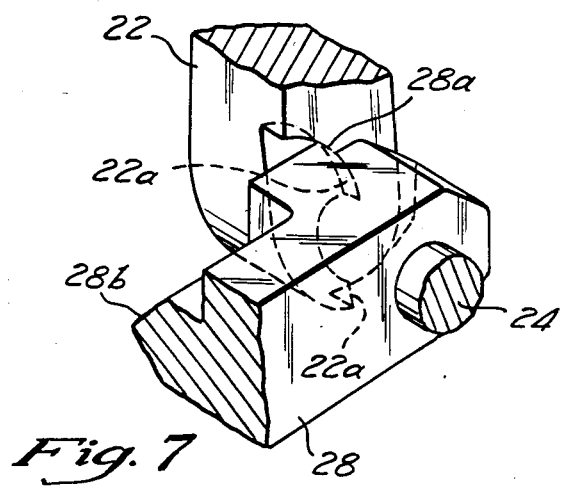
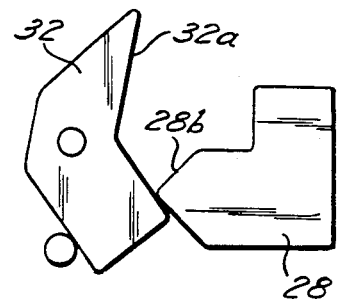

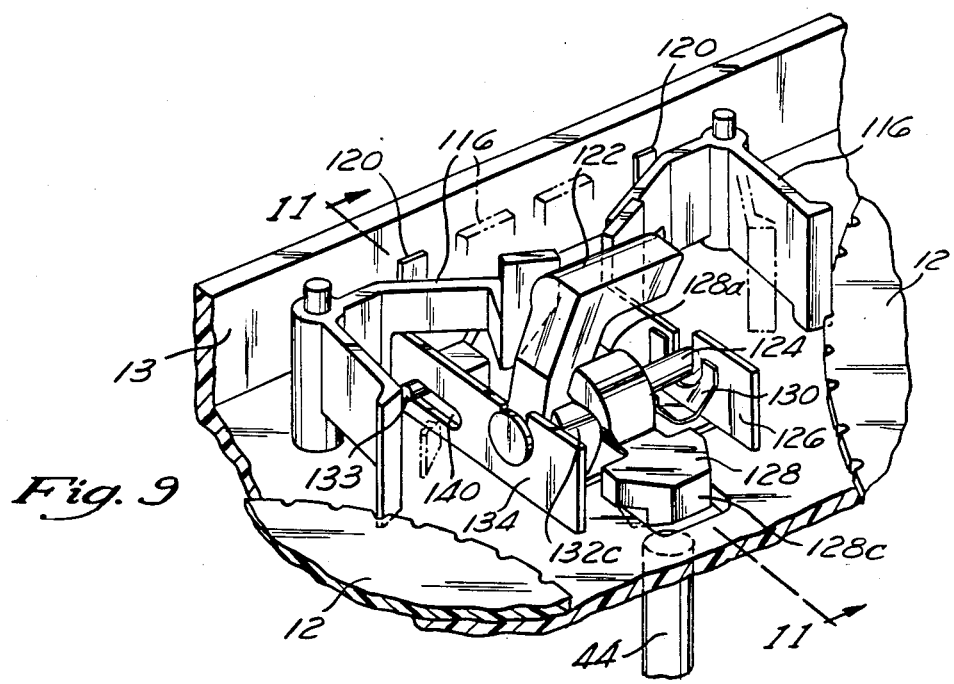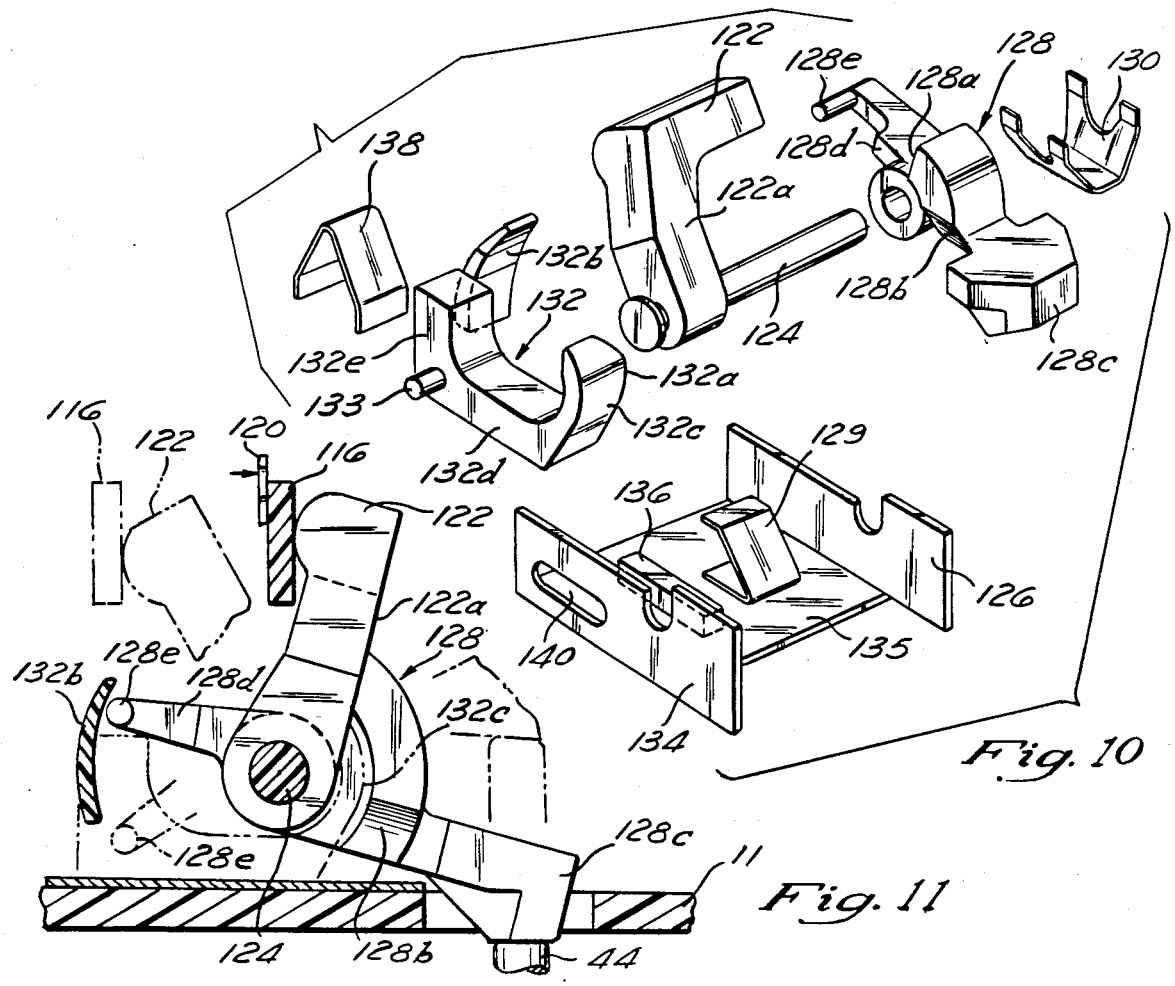

ns of the cassette is inserted into the player so that when the cassette is removed from the player, it will once more be in a locked condition and cannot be replayed unless once more unlocked by the unlocking device in the possession of the rental outlet. Such a system will control, to a large extent, the pirating and the renting of such pirated tapes. While the device will not prevent the user of the tape from copying the tape while it is still in the cassette player, it will not be easy for such tapes to appear in regular tape rental outlets, because upon examination, it will be apparent which cassettes require unlocking in the unlocking device and which do not.

CASSETTE LOCKING SYSTEM

FIELD OF THE INVENTION

This invention relates of cassette tape recordings, particularly to video cassettes. Further, the invention relates to apparatus and methods for controlling the playing of such cassettes.

BACKGROUND OF THE INVENTION

The rental of video tape recordings has greatly expanded in recent years. Although the industry has been very successful from the standpoint of increased demand of rental tapes, several problems have developed which might greatly reduce the industry's potential. The first and foremost problem from the retailers point of view is that of product theft from the distribution network by employees and customers. A stolen rental tape may be illegally reproduced many times and then illegally rented, thus depriving the proper owners of the rights involved of very significant income. Acording to one report, theft in 1985 amount to $14,000,000 in connection with one retail outlet chain alone.

Additionally, there exists the case where a customer does not return the video tape. Some rental outlets pay private security firms a fee for each tape recovered. It is believed that theft losses of hundreds and in some cases thousands of dollars per month per store may occur.

A second major problem for the retail rental outlet is the need for additional tapes to rent. This is a two-pronged problem. First, there is an overall shortage of different recordings available and, second, there is a delay between theatrical release and video release. Because of the tape pirating problem, the producers of new releases feel that they are not receiving a fair return on their product. They have little incentive to fill the industry's needs for new titles when they know that each tape sold into the rental industry will reduce their traditional markets.

Another element of the problem is the cost of video tapes. Normally, a rental outlet must buy the tapes and the cost varies between $40 and $80 each when new. Because of this, many retailers resort to buying used tapes on the open market for lesser amounts. This, in turn, is an incentive for pirates to satisfy this demand. It is believed that many of the studios and independent producers of video tapes would be happy to fill the need for additional product if there were some way for them to participate in the revenues generated by the rental of their product.

Thus, the need exists for an improved system for controlling the rental of video tapes. Such a system must reduce the theft and pirating problem. Also, it is desirable that such a system allow the producers of video tapes to participate more equitably in the revenue generated from renting tapes. Further, it is desirable that retail rental outlets be able to provide their service with a minimum investment of initial capital to participate in the business.

SUMMARY OF THE INVENTION

In accordance with the method of the invention, a video cassette is provided with a mechanism that will prevent it from being placed in a cassette player unless it is first unlocked or set by an unlocking device which is in the control of the retail rental outlet. The renter can then properly utilize the cassette in his cassette player. However, the mechanism within the cassette is automatically reset or readied when the cassette is inserted into the player so that when the cassette is removed from the player, it will once more be in a locked condition and cannot be replayed unless once more unlocked by the unlocking device in the possession of the rental outlet. Such a system will control, to a large extent, the pirating and the renting of such pirated tapes. While the device will not prevent the user of the tape from copying the tape while it is still in the cassette player, it will not be easy for such tapes to appear in regular tape rental outlets, because upon examination, it will be apparent which cassettes require unlocking in the unlocking device and which do not.

In a preferred approach, the locking and unlocking of the cassette is provided by utilizing a mechanism which cooperates with the reel brakes which are currently utilized in video cassettes. The brakes which are currently used prevent the reels from rotating during shipment and handling. When a cassette is inserted into a cassette player, a standard pin in the player protrudes upwardly through a hole in the base of the cassette and pivots a crank or lever which releases the brakes. In the preferred form of the invention, the brake release lever is modified and its operation controlled to provide the desired function.

More specifically, the brake release lever is disabled by a locking or disabling mechanism so that the brake cannot be released without the proper unlocking device. The disabling mechanism is operated or inactivated by the separate unlocker device in the control of the retail rental outlet so that the brake release mechanism will function in the usual manner upon being engaged by the standard pin found in a cassette player. Further, activating the brake release lever operates or readies the disabling mechanism in the cassette so that when the cassette is removed from the cassette player, the brake release lever is once more disabled so that the cassette cannot be replayed without once again being unlocked or operated by the unlocking device in the possession of the rental outlet.

In a preferred form of the apparatus, the standard brake release lever or crank in a video cassette is modified and formed in two parts instead of one. The parts are normally urged into engagement to function as a single unit to unlock the standard brake within a cassette. However, the locking or disabling mechanism disables the lever by separating the parts sufficiently to prevent them from functioning in the normal manner. Thus, if the cassette is inserted into a player when it has not been unlocked, only one part of the lever will move in response to the standard pin in a cassette player which protrudes into the cassette, and this movement will be ineffective to release the cassette reels. The disabling means is withdrawn or prevented from interfering with the two-part lever when the cassette is unlocked or activated by the separate unlocker. Thus, when the cassette is inserted into the player, the two-part crank will function as one allowing the cassette brakes to be released and the cassette reels to operate. As the two-part crank moves, it releases or readies the lock mechanism so that the two-part crank is automatically moved to a disabled condition when the cassette is removed from the player, so that it is once more necessary to place the cassette in the unlocker before it can be replayed.

In one form of the apparatus, a pivotally mounted cam lever is held in one position by a spring loaded pin wherein the lever holds one part of the crank out of engagement with the other part of the crank. Retracting the pin with the separate unlocker means allows the pivotally mounted lever to be pivoted out of the way by a biasing force on the part of the crank that had been engaging the lever. The crank is then readied to operate as a single unit to release the brake when the cassette is placed in the player. Movement of the two-part crank pivots the cam lever which in turn releases the spring loaded locking pin. This pin then engages the cam lever so that it is once more in a position to hold a part of the crank away from the other part when the crank is returned to its normal position as the cassette is removed from the player.

In another form of the apparatus for the lock mechanism, the pivoting cam lever and the spring loaded pin are replaced by a spring loaded slidable latch which biases one part of the crank away from the other in one position, but is then movable by the unlocking means into a second position wherein the crank parts can function as one. The crank holds the latch in the unloaded position. The movement of the crank releases the latch so that it is moved by spring force into position to once more separate the crank parts when the cassette is removed from the player. To reset the latch, it is necessary to insert a pin to pivot the crank, and insert a hook or other means to retract the slidable latch.

A major advantage of the system described is that with better control of tapes at the retail outlet level, producers of new releases are more likely to be willing to allow retailers to rent tapes to customers without first buying them from the producers, in that the producer can share in the rental income with less concern about being cheated. The detail recordkeeping of rental transactions can be performed by a computerized system forming part of the unlocking device.

SUMMARY OF THE DRAWINGS

FIG. 1 is a perspective view of a video cassette which incorporates the locking mechanism of the invention.

FIG. 2 is a perspective view of a portion of the cassette shown within the area 2 indicated in FIG. 1.

FIG. 3 is an enlarged perspective view of the brake release and the locking mechanism, as shown in FIG. 2, with the components in a condition wherein the cassette is prevented from being operated.

FIG. 4 is a perspective view similar to that of FIG. 3 but with the locking mechanism moved to an unlocked position which enables the cassette brake release crank to move as a unit to release the brakes.

FIG. 5 is a view similar to that of FIGS. 3 and 4 illustrating the brake release crank being pivoted into the brake release position with the lock mechanism once more in its locked position as in FIG. 3.

FIG. 6 is an exploded perspective view of the two-part crank of FIGS. 2-5.

FIG. 7 is an enlarged perspective view of the two-part crank in an engaged position.

FIG. 8 is an enlarged elevational view of the lower portion of the crank, the cam lever and the locking pin.

FIG. 9 is a perspective view of another form of the invention.

FIG. 10 is an exploded perspective view of the main components of the mechanism shown in FIG. 9.

FIG. 11 is a cross-sectional view on line 11—11 of FIG. 9 illustrating the operation of the brake release crank.

DETAILED DESCRIPTION OF THE EMBODIMENT OF FIGS. 1-8

Figure 12:
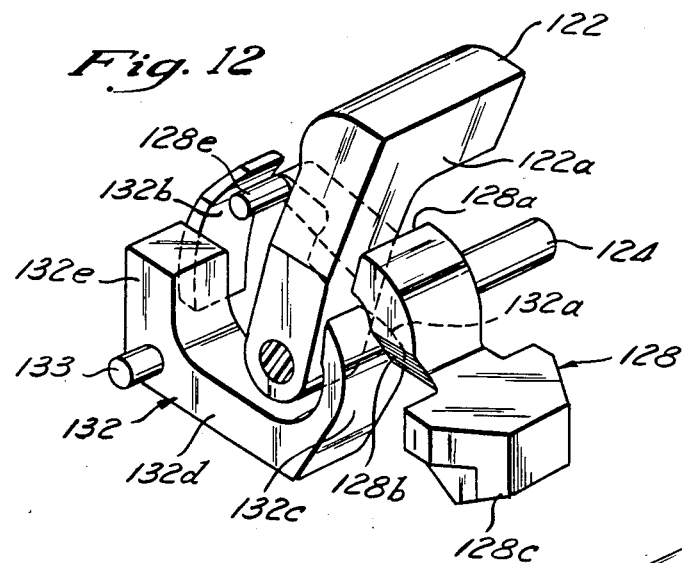
FIG. 12 is a perspective view illustrating the brake release lever and the lock mechanism is an unlocked position.

FIG. 1 illustrates a rectangular, generally flat video cassette 10 having a pair of tape reels 12, shown in broken lines. As seen in FIG. 2, each of these reels has a lower disc with a plurality of notches 14 formed in its periphery. Each of the notches cooperates with an end 16a of a pair of brake pawls 16 movably mounted in the cassette. More specifically, the pawls are irregularly shaped elements each of which are pivotally mounted near its midsection on a post 18 extending upwardly from the bottom wall 11 of the cassette 10. A biasing spring 20 is mounted on the upper end of the post 18, with one end of the spring biased against a stop 19 extending upwardly from the bottom wall 11, and the other end of the spring 20 engaging a short tab 16c extending upwardly from the main body of each pawl.

The other end 16b of each pawl engages the backside of the upper end of an upper lever or crank part 22 which is mounted on a shaft 24. The shaft in turn is rotatably supported on uprights 26 and 34 extending upwardly from the bottom wall 11. As can be seen, the crank part 22 has somewhat of an inverted L-shape with the lower end of the vertical leg being attached to the shaft 24 and the upper horizontal leg engaging the ends 16b of both of the pawls 16. The biasing of the spring 20 is such that the pawl end 16a is urged into the engagement of the notch 14 in the reel disc 12 to prevent the reels from rotating. The other end 16b of each pawl urges the crank part 22 to pivot in a forwardly direction to the position shown in FIGS. 2-4.

Also mounted on the shaft 24 is a lower or second crank part 28 which extends generally horizontally and downwardly with its outer end being located adjacent to the bottom wall 11 of the cassette when the cassette is not in a cassette player. The crank part 28 is provided with a pair of diametrically spaced teeth or lugs 28a that face and cooperate with corresponding lugs 22a on the upper crank part 22. As may be seen from FIGS. 6 and 7, these crank parts fit together to function as a single unit when the teeth or lugs are engaged, as shown in FIG. 7. A coil spring 30 surrounding the shaft 24 extends between the crank part 28 and the adjacent upright 26 to bias the crank part 28 towards the crank part 22 into their rotationally engaged position.

A latch lever 32 is pivotally mounted on the support 34, on a shaft 33 generally perpendicular to the shaft 24. The right edge 32a of the latch lever 32 cooperates with a cam edge 28b on the crank part 28, as best seen in FIG. 8.

A latch or lock pin 36 slidably extends through suitable supports beneath the shaft 24, with the forward end 36a of the pin protruding into the path of movement of the latch lever 32. A coil spring 38 surrounds the rear portion of the pin 36 extending between a support wall 40 and a flange 36b on the pin 36. The spring 38 urges the pin forwardly to the position illustrated in FIG. 3, and the flange 36b limits the forward movement of the pin by engaging the support 42.

Video cassette players currently in use include a pin 44 which is located to protrude upwardly through a hole 46 in the lower wall 11 of the cassette housing when the cassette is inserted into the player. The outer end of the lower crank part 28 is positioned above the hole 46 so that it is in line to be engaged by the pin 44.

OPERATION OF THE EMBODIMENT OF FIGS. 1–8

When the cassette 10 is inserted into a cassette player, the pin 44 extends upwardly into the cassette housing in the position shown in FIG. 5. With a conventional one-piece crank, as currently used on the market, the crank would be pivoted upwardly in a counterclockwise direction as viewed in FIGS. 2–4 causing the crank to be moved against the ends 16b of the pawls 16 against the urging of the springs 20. This will cause the pawls 16 to pivot so that their ends 16a are moved out of engagement with the notches 14 in the reels 12. Thus, the reels are free to rotate. However, with the two-part crank of the invention, the lower crank part 28 will pivot independently of the upper crank part 22 if the parts are not interengaged as shown in FIG. 7. Thus, the lock mechanism of the invention maintains the two-part crank in an ineffective or disabled position except when the cassette is to be rented.

This disabled or locked position is illustrated in FIG. 3. This is the position in which the cassette will normally be shipped to the retail store outlet after the recording has been applied to the tape in the video cassette. In that condition, the coil spring 30 urges the lower crank part 28 to the left as viewed in FIG. 3, attempting to place the crank part 28 in engagement with the upper crank part 22. However, the cam edge 32a of the latch 32 engages the cam edge 28b of the lower crank part 28 to prevent the crank parts from interengaging. This condition is shown in FIG. 8. Note that although the latch lever 32 is urged to be pivoted out of the way by the lower crank part 28, the latch or lock pin 36 prevents the latch lever 32 from pivoting. Thus, if the cassette is inserted into the player in that condition, the lower crank part 28 will pivot ineffectively without moving the upper crank part 22.

To unlock the mechanism, it is only necessary to retract the latch pin 36 so that the latch lever 32 can be pivoted out of the way by the urging of the coil spring 30 against the lower crank part 28. FIG. 4 shows the pin retracted and the latch lever pivoted over the end of the retracted pin. The crank part 28 is then free to move further to the left so as to be interengaged with the upper crank part 22.

The latch pin 36 may be retracted by a suitable tool 48 which is inserted through a hole in the wall of the cassette and is adapted to cooperate with the end of the latch pin 36. The pawl 16 is formed to accommodate such a tool. Any suitable releasable connecting means may be provided for this purpose, such as threads or a bayonet-type connection. The details of this connection are not shown in that various arrangements can be utilized. Instead, the tool 48 is merely schematically illustrated to represent any suitable means for retracting the pin. In the production form of the invention, it is contemplated that a more sophisticated unlocking device will be employed and that such device will not be readily duplicated by would-be tape pirates so that the unlocking of cassettes can be easily controlled at the retail outlet at which the cassette is rented.

With the latch pin 36 withdrawn, the locking mechanism appears as shown in FIG. 4. When the cassette is inserted in a player, the player pin 44 extends upwardly into the cassette in a position as shown in FIG. 5 and will pivot the two-part lever 22/28 into the "play" position causing the brake pawls 16 to pivot so as to release the reels.

At the same time, the lock mechanism is readied or reset so that the two-part crank will be disengaged when the cassette is removed from the player. More specifically, as the crank 22/28 is moved into the position shown in FIG. 5, the edge 28b slides along the edge 32a of the latch lever, starting from the position shown in FIG. 4, and pivots the lever into the position shown in FIG. 5. This action undercovers the end of the latch pin 36, and its coil spring 38 urges the pin forwardly once more into the locking position, as shown in FIGS. 3 and 5. When the cassette is withdrawn from player, thus being moed away from the player pin 44, the crank part 28 can fall by gravity into its lower position as shown in FIGS. 3 and 4. It is also positively moved by the spring biased pawls 16 urging the upper crank part 22 forwardly, which in turn pivots the lower crank part 28 downwardly. As this lower part 28 is pivoting downwardly, its cam surface 28b rides against the now-locked latch lever 32. This action pushes or urges the crank part 28 on the shaft 24 away from being engaged with the upper crank part 22 and against the urging of the coil spring 30. Thus, the cassette is once more in the locked condition of FIG. 3 such that the cassette cannot be played without once more utilizing the unlocking tool or some such unlocking device.

EMBODIMENT OF FIGS. 9–14

FIGS. 9–14 illustrate another embodiment of the invention which performs the same function as the above-described embodiment, but it employs different mechanical components. It also employs a two-part crank, but the parts are shaped somewhat differently from that of the first described version.

More specifically, the arrangement shown in FIG. 9 employs spring loaded pawls 116 which are urged by springs 120 to cooperate with the cassette reel discs 12 and are comparable to those shown in FIG. 2. The pawls 116 through the urging of the springs 120 urge forwardly an upper part 122 of a two-part crank mounted on a shaft 124, which is mounted on suitable supports 126 and 134. A lower crank part 128 is rotatably mounted on the shaft 124 and is urged into engagement with the crank part 122 by means of a U-shaped leaf spring 130. As best seen from FIG. 10, the lower crank part 128 is an irregularly shaped member having a lug 128a which cooperates with a corresponding surface 122a on the crank part 122 when these parts are engaged to operate as a single unit.

The crank part 128 further includes a forward portion 128c which is aligned to cooperate with a standard pin 44 of a cassette player which protrudes into the cassette when it is inserted into the player, as discussed above. A leaf spring 129 extends between a plate 135 and the rearwardly extending portion 128d of the crank part 128 to pivot the forward portion of the crank part 128 against the bottom wall of the housing and over the pin 44. The crank part forward portion also includes an edge cam surface 128b which cooperates with a slidably mounted latch 132. The lower crank part 128 further includes a rear portion 128d carrying a finger 128e which extends generally parallel to the shaft 124 and cooperates with a curved lug 132b on the latch 132.

As may be seen, the latch 132 has a generally U-shape, including a forward upstanding leg 132c having a cam edge 132a, a lower portion 132d and a rear upstanding leg 132e which is further connected to support the curved lug 132b that extends towards the finger 128e of the crank part 128. The latch 132 is slidably positioned between the support wall 134, secured to the cassette housing lower wall 11 and spaced from a guide 136 also secured to the lower wall housing through an intermediate plate 135. The latch 132 is urged to slide forwardly between the wall 134 and the guide 136 by a leaf spring 138 that extends between the latch leg 132e and a rear upstanding wall 13 of the housing. A stub projection 133 extends outwardly from the latch 132 and into a slot 140 in the support wall 134. This projection guides the back and forth movement of the latch 132.

OPERATION OF THE EMBODIMENT OF FIGS. 9-14

In the unlocked position of the latching or locking mechanism, the latch 132 is retracted or held rearwardly against the urging of its spring 130. The latch is held in that unlocked position by virtue of the curved lug 132b on the latch 132 engaging the finger 128e on the crank part 128, as illustrated in FIGS. 11 and 12. This also might be termed the latch disabled position. With the latch held in that position, its forward portion 132c does not hold the lug 128a away from the crank surface part 122a. Thus, the crank parts 122/128 are in position to operate as a single unit. When the cassette is inserted into a player, the lower crank part is urged upwardly by the pin 44 to the phantom line play position shown in FIG. 11 and the positions shown in FIG. 13. This pivots the crank 122/128 in a counterclockwise direction pivoting the pawls 116 against the urging of the springs 120 to release the reels 12 and allow the tape to be played.

Figure 13:
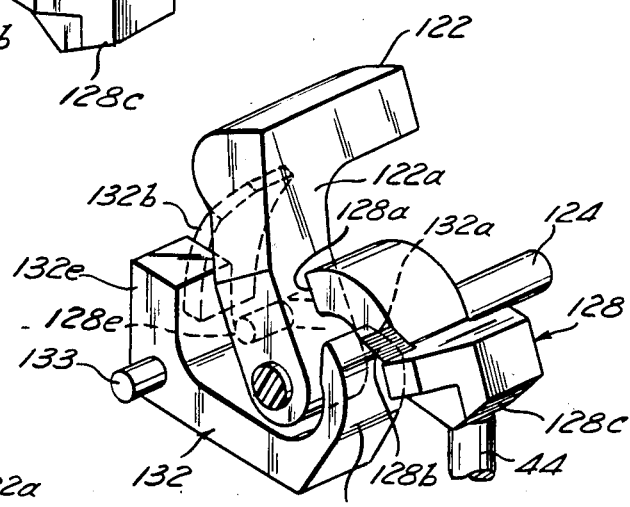
FIG. 13 illustrates the components of FIG. 12 in a position immediately after the unlocked crank has been pivoted to its brake release position.

When the crank is in its extreme position for releasing the brake pawls, as shown in FIG. 13, and in phantom in FIG. 11, the finger 128e is beneath the lower end of the curved lug 132b. Thus, the latch 132 is free to be urged forwardly by the spring 138. The forward leg 132c slides beneath the forward end of the crank part 128 to the solid line position shown in FIG. 14. The part end 128c is still in an elevated position by virtue of the player pin 44. Also, the latch curved lug 132b moves forwardly over the finger 128e to the other side of the finger.

When the cassette is removed from the player, the crank part 128 is released from the upward force of the pin 44 and its biasing spring 129 urges the forward end 128c downwardly towards the lower wall of the cassette housing. During this movement, the edge 128b of the crank part 128 engages the cam edge 132a of the forward leg 132e of the latch 132. This action cams the crank part 128 axially away from the upper crank part 122 against the urging of the spring 130. The latch components are then in the position shown in FIG. 14, wherein it can be seen that the crank parts are disabled no longer engaged as one unit, the lower part 128 having slid to the right of the part 122. Also, the finger 128e is behind the lug 132b so that the latch 132 cannot be retracted to the unlocked position. Thus, the user cannot replay the tape.

Figure 14:
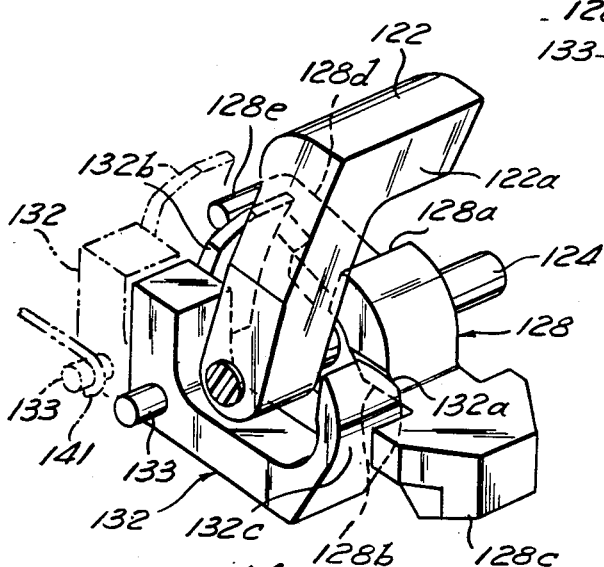
FIG. 14 illustrates the components of FIGS. 12 and 13 in the locked condition.

To reset the mechanism, as would be done by a video rental store owner prior to renting a tape, a reset mechanism or unlocking device will first insert a pin like the pin 44 through the cassette case to pivot the lower crank part 128 to the position shown in phantom lines in FIG. 11. Note that part 122 does not pivot then. During this action, the finger 128e on the rear portion of the crank part pivots downwardly on an arc behind the curved lug 132b to a position below the lug. Once the crank part 128 has been pivoted to its extreme counterclockwise position, the latch 132 including its curved lug 132b can be retracted against the forward bias of its spring 138. The reset mechanism includes a hook 141 as seen in FIG. 14, which provides a means for retracting the latch 132 by pulling rearwardly on the stub pin 133. While the latch is held in the retracted position, the pin supporting the forward end 128c of the crank part 128 is withdrawn and the crank part is allowed to return to its normal position as urged by its biasing spring 129 so that the forward portion 128c of the crank part is engaging or adjacent to the lower wall of the housing. Simultaneously, the finger 128e moves upwardly. The latch 132 is then released. In that disabled or unlocked position, shown in FIG. 12 and in phantom lines in FIG. 14, the forward side of the lug 132b engages the finger 128e on the crank part 128 so that the latch 132 cannot slide forwardly in response to the urging of its spring 138. The crank part 128 is thus free to be moved by its spring 130 into the rotationally engaged position with the upper crank part 122. That is, the crank is enabled. Thus, when the cassette is inserted in the player, and the pin 44 is again inserted through the cassette case, lifting the forward end 128c of the crank part 128, the tooth 128a on the crank arm 128 will engage the upper crank arm surface 122a and permit the upper crank 122 to move the pawls 116, once more allowing the cassette to be played.

From the foregoing, it can be seen that the mechanisms described cleverly lock or disable and unlock or enable the cassette reels, thus providing control over the use of the cassettes by the rental operators. It can be appreciated that a variety of locking mechanisms can be utilized so long as they all have the necessary characteristic of preventing the cassette from being played until it is locked by an unlocking device and so long as the unlocking mechanism is responsive to movement produced by the standard pin in the cassette player so that the lock mechanism is reset when the cassette is withdrawn from the player. It should be further understood that the cassette may be locked and unlocked by other mechanisms that do not cooperate with the pawl brakes in the cassette. That is, the pawl brakes can function in the manner currently employed in prior art arrangements. Instead, a different lock mechanism may be employed with other aspects of the cassette structure so long as the basic requirements are met.

As indicated above, the schematically illustrated unlocking means 48, 141 and an element like the pin 44 can be incorporated into a sophisticated unlocking device wherein the rental retailer merely inserts the cassette into the device and the cassette is unlocked, without the retailer even knowing anything about the functioning of the unlocking device. Further, it is contemplated that the unlocking device be incorporated into computerized apparatus that will record and store rental data. That is, such items as the title of the cassette, the data and time of rental and return, and the identity of the renter can all be obtained and stored in the system. Accurate data of this type will allow the producers and copyright owners of the subject matter on the tapes to share rental income with the retail rental outlet.

What is claimed is:

1. A method of controlling the playing cassette tape recordings comprising the steps of:
   providing a lock in a cassette that, in its normally locked position, prevents the cassette from being played;
   unlocking said lock when the cassette is to be rented, so that the cassette when placed in a cassette player can be repeatedly replayed while it remains in the player; and
   readying the lock to be reset when it is unlocked so that when the cassette is inserted into a cassette player and then removed from the player, the lock automatically resets to prevent the cassette from being played.

2. The method of claim 1 including the steps of providing the cassette with a brake that prevents rotation of the reels in the cassette which support the tape, said brake being releasable by said player when the cassette is inserted into the player; and connecting said lock to said brake in a manner to prevent said brake from being released until said lock is unlocked.

3. A method of controlling the playing of cassette tape recordings comprising the steps of:
   providing a brake mechanism in a cassette that normally prevents the reels in a cassette from rotating when the cassette is not in a cassette player.
   providing means to release said brake automatically in response to the insertion of said cassette into said player;
   providing a means for disabling said brake release means so that the brake cannot be released while the release means is disabled;
   setting said disabling means so that the brake release means is enabled to release said brake in response to insertion of the cassette into the cassette player; and
   readying said disabling means in response to the operation of said brake release means so that said brake release means is disabled when the cassette is removed from the cassette player whereby the cassette cannot be replayed until said disabling means is reset.

4. Apparatus for controlling the playing of a cassette tape recording comprising:
   lock means in said cassette for preventing the cassette from being played;
   said lock means including means responsive to an unlocking device separate from said cassette whereby the playing of said cassette is controlled by the user of said unlocking device;
   said lock means including reset means responsive to a cassette player which activates said lock means so that said cassette is automatically locked when it is removed from the cassette player whereby replaying of said cassette is prevented unless said lock means is once more unlocked by said unlocking device;
   said lock means and said reset means permitting repeated playing and replaying of the unlocked cassette while it remains in the cassette player.

5. Apparatus for controlling the playing of a cassette tape recording comprising:
   lock means in said cassette for preventing the cassette from being played;
   said lock means including means responsive to an unlocking device separate from said cassette whereby the playing of said cassette is controlled by the user of said unlocking device;
   said lock means including reset means responsive to a cassette player which activates said lock means so that said cassette is automatically locked when it is removed from the cassette player whereby replaying of said cassette is prevented unless said lock means is once more unlocked by said unlocking device;
   said lock means and said reset means permitting repeated playing and replaying of the unlocked cassette while it remains in the cassette player;
   brake means for preventing the reels in said cassette from rotating;
   brake release means in said cassette responsive to said player for automatically releasing said brake when the cassette is inserted in a player; and
   means connecting said lock means to said brake release means in a manner to disable said brake release means after it has released said brake.

6. A cassette comprising:
   a pair of rotatably mounted reels;
   a pair of brake pawls pivotally mounted in the cassette;
   spring means for urging said pawls to cooperate with said reels to prevent the reels from rotating;
   a crank for moving said pawls in opposite to said spring means, said crank including an upper crank part mounted on a rotatably mounted shaft, and a lower crank part rotatably mounted on said shaft and being axially movable on said shaft so as to be movable into and out of rotational engagement with said upper crank part, means urging the lower crank part into rotational engagement with the upper crank part;
   means forming a hole in a wall of said cassette with an end of said lower crank part being normally urged to be positioned over said hole, said pawls being located to be moved by said upper crank part, and said crank parts being located to be pivoted by a pin in a cassette player extending through said hole to pivot said crank against said pawls to release said reels; and
   latch means in said cassette cooperating with said lower crank part to hold said lower crank part out of rotational engagement with said upper crank part, said latch means being adapted to be disabled by an external locking device.

7. Apparatus of claim 6, wherein said latch means includes a latch lever pivotally mounted in said cassette, said latch lever including a cam which cooperates with said lower crank part, said latch means further including a pin having one end positioned in the path of said latch lever holding the latch lever in a position wherein it prevents said lower crank part from being in rotational engagement with said upper crank part, means urging said pin into said latching position, said pin being mounted in a manner which permits the pin to be moved into a position wherein it does not interfere with the movement of said latch lever, said pin being movable in response to an unlocking device which is separate from said cassette.

8. The apparatus of claim 6, wherein said latch means includes a slidably mounted to latch which is movable from a first position wherein the latch disables said crank so that the crank parts are not rotationally engaged and a second position wherein the latch is retrcted so that the lower crank part is free to move to said rotationally engaged position in response to the urging of its spring, said lower crank part further includes means for holding the latch in its retracted position until such time as the crank is pivoted to a play position as when the cassette is inserted into a cassette player.

9. The apparatus of claim 8, wherein said latch is a generally U-shaped element having a forward portion for cooperating with a forward portion of said lower crank part to cam it out of its rotationally engaged position or allowing it to move into its enabled position, said lower crank part including a rear retaining finger, said latch further including a rear portion which cooperates with said finger to hold the latch in its retracted position.

10. The apparatus of claim 9, wherein said latch rear portion includes an upwardly extending leg and a horizontally extending curved lug which engages said finger on the lower crank part.

11. The apparatus of claim 9, wherein said lower crank part and said latch rear portion are arranged so that said latch can slide between said first and second positions when said crank lower part has been pivoted so that said finger is not in the path of said latch.

12. Apparatus comprising: a tape cassette;
means on said cassette for preventing it from being played; and
means for disabling said preventing means so that said cassette can be inserted into a cassette player and repeatedly played in a normal manner, while it is in the cassette player, said disabling means being separate from said cassette and separate from said player;
said preventing means being responsive to removal of said cassette from player so that said preventing means automatically prevents said cassette from being replayed once it is removed from said player unless the preventing means is once more disabled by said separate disabling means.

13. A method of controlling the playing of a cassette tape recording comprising the steps of:
locking a cassette so that it cannot be played unless it is unlocked by means of a device not under the control of the person who will be playing the cassette;
unlocking the cassette with said device when the cassette is to be played so that said cassette can be placed in a cassette player and repeatedly played while it remains in the player; and
relocking the cassette automatically in response to removing the cassette from a cassette player so that said cassette cannot be replayed unless it is once more unlocked by said device.

14. The method of claim 13 wherein said locking step is accomplished by disabling a brake means structure in said cassette used to release tape reel brakes in the cassette that are normally released by said structure in response to means in a cassette player when the cassette is inserted in the player;
said unlocking step is accomplished by enabling said brake release structure with said device so that said release structure will release said brakes when said cassette is inserted into the player; and
said relocking step is accomplished by disabling said release structure automatically in response to removing the cassette from the player.

15. Apparatus for controlling the playing of a cassette tape recording comprising:
a brake for preventing a reel in said cassette from rotating;
a brake releaser in said cassette responsive to a cassette player for automatically releasing said brake when the cassette is inserted in a player;
a lock mechanism in said cassette for preventing the cassette from being played;
said mechanism being responsive to an unlocking device separate from said cassette whereby the playing of said cassette is controlled by the user of said unlocking device;
said mechanism including reset structure responsive to a cassette player which activates said mechanism so that said cassette is automatically locked when it is removed from the player whereby replaying of said cassette is prevented unless said mechanism is once more unlocked by said unlocking device; and
said lock mechanism being connected to said brake releaser in a manner to disable said releaser after it has released said brake.

16. A method of controlling the playing of a cassette tape recording comprising the steps of:
inserting a tape cassette into a cassette player; releasing a cassette reel brake mechanism in the cassette automatically in resonse to the insertion of the cassette into said player; and
disabling the brake release means in response to removal of the cassette from the cassette player so that the cassette cannot be replayed until said disabling means is reset.

* * * * *

UNITED STATES PATENT AND TRADEMARK OFFICE
CERTIFICATE OF CORRECTION

PATENT NO. : 4,801,107

DATED : January 31, 1989

INVENTOR(S) : Dale A. Dixon and Forrest Hannan

It is certified that error appears in the above-identified patent and that said Letters Patent is hereby corrected as shown below:

Column 3, line 21, change the words "in the unloaded position" to --in the unlocked position--

Column 6, line 15, change the words "This action undercovers" to --This action uncovers--

Column 6, line 19, change the words "thus being moed" to --thus being moved--

Column 8, line 43, change the words "of preveting the" to --of preventing the--

Column 10, line 29, change the words "pawls in opposite" to --pawls in opposition--

Column 10, line 66, change the words "mounted to latch" to --mounted latch--

Column 11, line 2, change the word "retrcted" to --retracted--

Column 12, line 8, change the words "brake means structure" --brake release structure--

UNITED STATES PATENT AND TRADEMARK OFFICE
CERTIFICATE OF CORRECTION

PATENT NO. : 4,801,107

DATED : January 31, 1989

INVENTOR(S) : Dale A. Dixon and Forrest Hannan

It is certified that error appears in the above-identified patent and that said Letters Patent is hereby corrected as shown below:

Column 12, line 46, change the words "in resonse" to --in response--

Signed and Sealed this

Twenty-first Day of August, 1990

Attest:

*Attesting Officer*

HARRY F. MANBECK, JR.

*Commissioner of Patents and Trademarks*